United States Patent [19]

Barnes

[11] 4,099,807
[45] Jul. 11, 1978

[54] AIRBORNE PULSE MAGNETRON AND POWER SUPPLY SYSTEM

[75] Inventor: John A. Barnes, Stanton, Calif.

[73] Assignee: R. Ritter Corporation, Palo Alto, Calif.

[21] Appl. No.: 785,431

[22] Filed: Apr. 7, 1977

[51] Int. Cl.$^2$ .................... H02H 3/08; H02H 7/20
[52] U.S. Cl. .................................. 315/127; 315/141; 328/8
[58] Field of Search ............... 315/141, 127, 119, 120, 315/128; 328/8, 9

[56] References Cited

U.S. PATENT DOCUMENTS

| | | | |
|---|---|---|---|
| 2,508,548 | 5/1950 | Spaulding, Jr. | 315/127 X |
| 3,063,012 | 11/1962 | Jackson | 328/8 |
| 3,317,699 | 5/1967 | Helfer | 328/8 X |

Primary Examiner—Alfred E. Smith
Assistant Examiner—Charles F. Roberts
Attorney, Agent, or Firm—Poms, Smith, Lande & Glenny

[57] ABSTRACT

The power supply for an airborne pulse radar includes an unfiltered source of 400 cycle AC power connected to a full wave rectifying circuit including two diodes associated with each phase of the three phase input circuit. In addition, three SCR's are employed for controlling the operation of the rectifiers. During normal operation of the pulse magnetron power supply, the control electrodes of the SCR's are biased to the conducting or enabled state by a small floating DC voltage which is obtained from a small DC power source which includes a rectifier circuit connected to the floating secondary of a low voltage transformer. When a fault is sensed in the magnetron pulse circuitry as indicated by the drawing of excessive current, a switching circuit is activated which removes the enabling voltage across the SCR's, so that the input rectifier circuitry is disabled, thus preventing burn-out of components included in the pulse generation circuitry.

7 Claims, 3 Drawing Figures

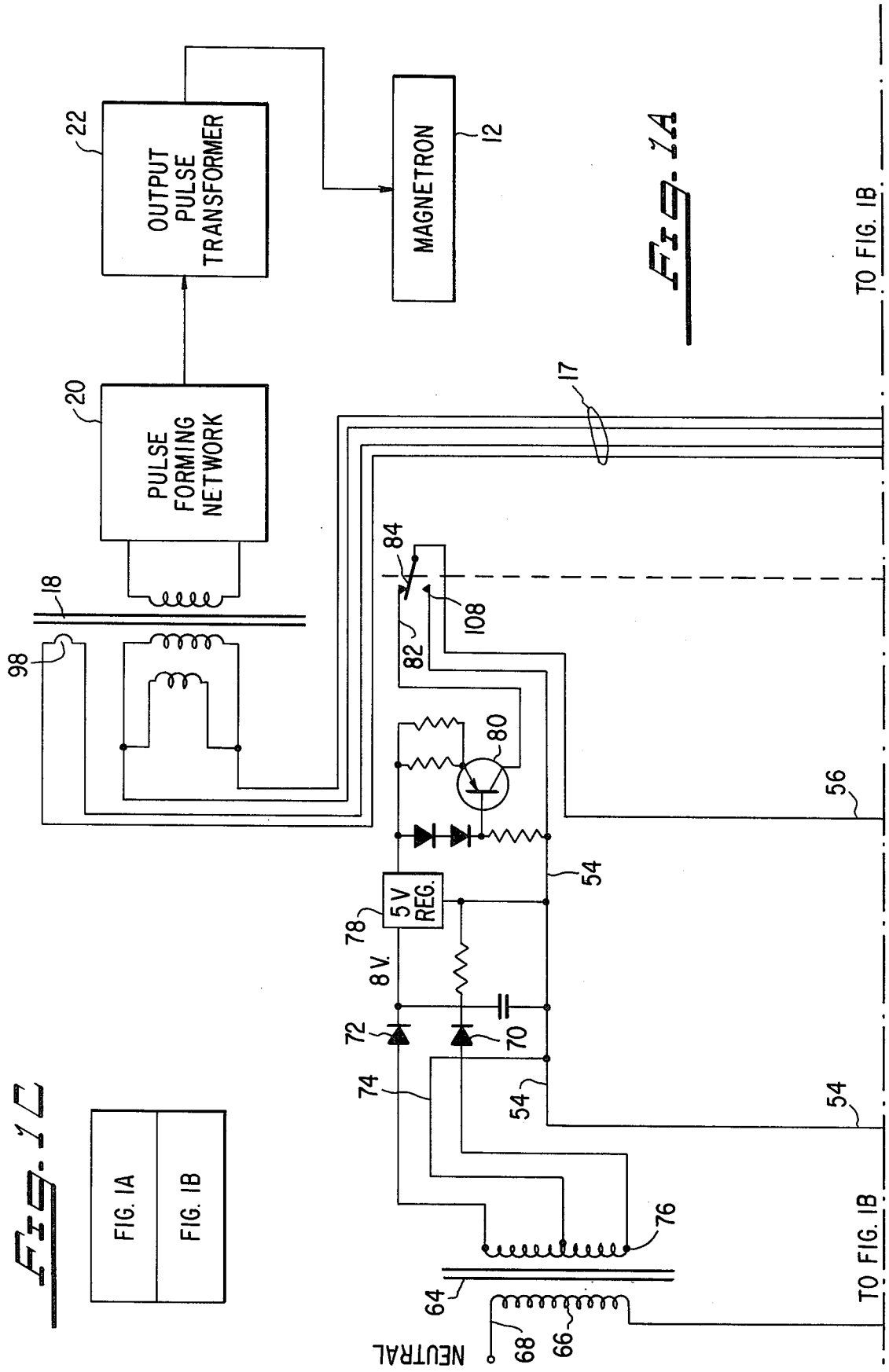

400 # AIRBORNE PULSE MAGNETRON AND POWER SUPPLY SYSTEM

BACKGROUND OF THE INVENTION

This invention relates to pulse magnetron power supply circuits.

In the field of airborne pulse magnetron power supply circuits it is customary to rectify the three phase 400 cycle aircraft power and to energize the pulse magnetron circuitry with the resultant DC power supply. For fault protection the rectifiers are provided with series connected SCR's and it has been the practice to apply high frequency pulses to the SCR's so that they are turned on shortly after the initiation of their "positive going" cycles. Then, when a fault is detected, the high frequency triggering source is disabled, and the rectifier circuits are blocked. However, this use of high frequency, such as 40 kilohertz, for providing triggering pulses to the SCR's in the rectifier circuits has certain disadvantages. Specifically, particularly where the power supply has no input transformer or other inductance to block the high frequency signals, undesired radiation may be fed back through the power system into other aircraft electronic systems and may cause undesired and potentially dangerous interference or other side effects.

Accordingly, a principal object of the present invention is to provide an improved rectifier control circuit for airborne pulse magnetron systems, and more specifically, one which does not introduce spurious radio frequency signals into the aircraft power supply.

SUMMARY OF THE INVENTION

In accordance with the present invention the rectifiers in the power supply for an airborne pulse magnetron have associated semiconductor control elements which are normally biased to the enabled state by a small DC voltage. This may conveniently be provided by a transformer having a floating secondary and a low voltage rectification circuit. Fault sensitive switching circuitry is also provided, so that if the magnetron pulse generation system develops a fault and starts drawing high levels of current, the low level DC enabling voltage may be promptly removed, thus inactivating the input rectification circuit. It is noted in passing that the pulse generation circuitry, including the high current charging circuits, the square magnetization plot reactances and transformers, and the pulse forming network for providing hundreds of kilowatts for a microsecond are highly sophisticated circuits, with tight heat dissipation characteristics and tolerances to provide a minimum size and weight package; accordingly, any deviations in control signal level or timing can quickly precipitate overload conditions.

An important advantage of the present invention is that the provision of a low level DC voltage enabling circuit instead of the RF pulses for controlling the rectification precludes the adverse radio frequency radiation into the aircraft power supply and avoids the possibility that other aircraft systems may be adversely affected or malfunction as a result of such uncontrolled radiation.

Other objects, features and advantages of the present circuit will become apparent from a consideration of the following detailed description and from the drawing.

BRIEF DESCRIPTION OF THE DRAWING

The single FIGURE of the drawing shows an airborne pulse magnetron system including a power supply illustrating the principles of the present invention. The circuit is shown on two sheets as FIGS. 1A and 1B with FIG. 1C indicating the relationship of FIGS. 1A and 1B.

DETAILED DESCRIPTION

Figure 1B:
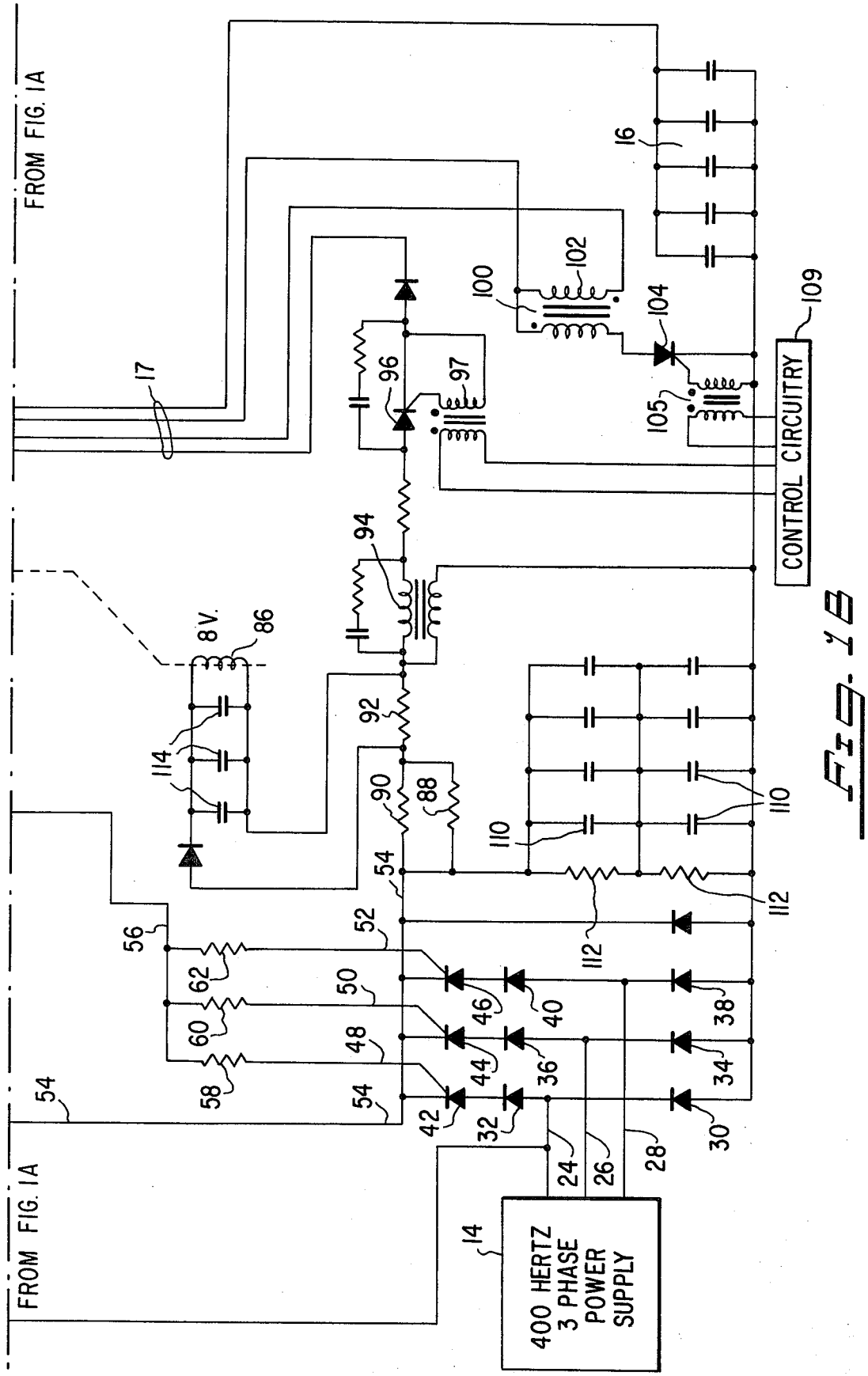

Referring to the drawing, the magnetron 12 shown at the right-hand side of the drawings is to be energized from the three phase 400 cycle per second alternating current power supply 14 shown at the far left of the drawing. In supplying a pulse to the magnetron 12, the bank of capacitors 16 is initially charged. Subsequently, the bank of capacitors 16 is discharged through the saturable transformer 18, this action energizes the pulse-forming network 20, and an appropriate pulse is supplied by the output pulse transformer 22 to magnetron 12.

By way of background to the present type of magnetron energization circuits, reference is made to my prior co-pending application, Ser. No. 767,347 filed Feb. 10, 1977 and entitled "High Power Variable Pulse Width Triggering Circuits", assigned to the assignee of the present invention, and reference is also made to two texts which provide useful background information on this type of circuit: (1) High power Semiconductor — Magnetic Pulse Generators", by G. T. Coate and L. R. Swain, Jr., 1966, the M.I.T. Press, Cambridge, Massachusetts; and (2) Pulse Generators, edited by G. N. Glasoe, and J. V. Lebacqz, 1948, Dover Publications, Inc., 180 Varick Street, New York, N.Y. 10014.

In general it might be noted that the power requirement for pulsing a magnetron are somewhat unusual in that relatively high powers for very short periods of time are required. More specifically, the pulse to be applied to the magnetron 12 might be in the order of several hundred kilowatts or 25 amperes at between 20,000 and 30,000 volts. The length of the pulse might be in the order of 1 or 2 microseconds, down to a fraction of a microsecond, and the pulse repetition rate might be in the order of 1,000 or 2,000 pulses per second. In operation, the DC power supply, to be described in substantial detail later, charges the bank of capacitors 16 during the interval between pulses, and then, when the bank of capacitors 16 is discharged rapidly, the brief but powerful pulse is generated and applied to magnetron 12.

Proceeding to consider the direct current power supply circuit in greater detail, the alternating current from source 14 is applied on the three lines 24, 26 and 28. Rectification is accomplished by the three pairs of diodes 30 and 32, 34 and 36, and 38 and 40, which are connected directly to the source 14 without the interposition of a transformer, in view of weight considerations in airborne systems. Rectifying action of the pairs of diodes is controlled by the SCR's 42, 44, and 46, respectively. The control electrodes for the three SCR's 42, 44, and 46 are connected to leads 48, 50, and 52, respectively. A control voltage is applied between the leads 48, 50, and 52, and the common line 54 of the SCR's. When the control electrode, such as 48, is at the same voltage as lead 54, the SCR 42 is turned off and no rectification action occurs. However, when the lead 48 to the control electrode SCR 42 is at a positive voltage of about 2 volts or more, with respect to lead 54, the SCR is fully conductive and normal recitifcation action by diodes 30 and 32 occurs. Of course the action with regard to the order two of the three phases is the same.

Under normal operating condition when the magnetron is in operation, the SCR's 42, 44, and 46 are all turned on by the application of a positive 5-volt potential applied to lead 56 and which is in turn routed through resistors 58, 60, and 62 to control leads 48, 50, and 52. This positive 5-volt potential is applied to lead 56 with respect to lead 54, and a "floating" control voltage is employed.

In considering the generation of the 5-volt floating control voltage, it is obtained by the use of the step-down transformer 64 having a primary 66 connected between one of the three phase lines 24 and the neutral line 68. The two diodes 70 and 72 provide full wave rectification with respect to the center tapped line 74 of the secondary 76 of transformer 64. Additional components employed in regulating the rectified alternating current include the National Semiconductor 5-volt regulation chip 78 and a current-limiting transistor 80. Other conventional circuit components are also employed. A regulated and limited 5-volt DC supply is then applied from lead 82 through contact 84 of a control relay to line 56. The relay contact 84 is controlled by coil 86.

The main charging circuit for the capacitor bank 16 runs from the direct current line 54 through resistors 88 and 90, through fault-sensing resistor 92, and through inductor 94. SCR 96 is the charge controlling SCR, and charging action does not occur until SCR 96 is enabled. As the capacitor bank 16 is charged, a number of the square-wave reactances and transformers included in the pulse generation circuitry are reset. This action includes the resetting of the output pulse transformer 22, the saturable transformer 18 through coil 98, and the delay reactance 100 through winding 102. As is known in the art and as discussed in detail in my prior co-pending application cited above, the present pulse circuits employ square hysteresis loop magnetic materials, and resetting of these magnetic cores is essential to proper pulse operation.

The control relay 86 operates on about 8 volts. It is sensitive to the voltage across the 0.2 ohm resistor 92. The normal charging current through resistor 92 to the capacitor bank 16 is approximately 3 amps. Under fault conditions which could arise for example by simultaneous energization of both the charging SCR 96 and the discharging SCR 104, the current would build up to 40 to 50 amps. Accordingly, under normal current conditions the voltage developed across the fault-sensing resistor 92 would be approximately 0.6 volts, while in the presence of a fault, the voltage would build up to approximately 8 or 10 volts. Accordingly, with the relay 86 being operative at approximately 8 volts, the relay 86 is promptly operative under fault conditions and relay contact 84 is shifted from line 82 which is at +5 volts to contact terminal 108 which is of course connected to lead 54 and therefore reduces the biasing voltage applied to leads 48, 50, and 52 to 0. This of course turns off SCR's 42, 44, and 46 blocking further rectification action. This action prevents the burn-out of components which would otherwise promptly occur with the high levels of current which flow under fault conditions of the type noted above.

For completeness, the control electrodes of charging control SCR 96 and triggering or discharge control SCR 104 are shown connected to the timing control circuitry 109 from which they are energized through transformers 97 and 105, respectively. It is also noted that the saturable transformer 18 is located physically adjacent the bank of capacitors 16; however, in the present drawings merely because of drawing space considerations, the leads 17, connected from that portion of the circuit designated FIG. 1B on the second sheet of the drawings to FIG. 1A on the first sheet of the drawings are shown as being of substantial length, contrary to the actual physical arrangement.

It is also noted in passing that not all of the components which appear in the circuit have been described in detail, particularly in cases where the functions are obvious. This would of course include capacitors 110 and resistors 112 which form part of the filter circuit associated with the direct current power supply, and the capacitors 114 in parallel with the relay coil 86 and which avoid false operation of the relay when transient voltages appear across the fault-sensing resistor 92. The function of other components which have not been described in detail are believed to be apparent to one skilled in the art. It is also clear that minor changes could be made in the circuit shown in the drawings without departing from the scope of the present invention. Thus, by way of example but not of limitation, the circuit of the invention could be employed with variable pulse length magnetron circuits; other circuits for obtaining a relatively low floating DC potential could be employed; and other equivalent components could be used in place of those shown in the attached circuit. Accordingly, the present invention is to be limited only by the scope of the appended claims.

What is claimed is:

1. An airborne pulse magnetron system including a power supply comprising:
   a magnetron;
   pulse output transformer means connected to power said magnetron;
   a pulse forming network connected to said output transformer;
   a capacitor storage circuit;
   a pulse transformer interconnecting said capacitor storage circuit and said pulse forming network;
   control circuitry for charging and for selectively discharging said capacitor storage circuit;
   a source of four hundred cycle AC power;
   rectification means coupled to said AC power source for providing DC charging current for said capacitor storage circuit;
   semiconductor means including control electrodes, for selectively enabling or disabling said rectification means;
   means for deriving a low level DC enabling voltage from said AC source;
   means for normally applying said enabling voltage to the control electrodes of said semiconductor means; and
   control circuitry responsive to high current fault conditions for removing said enabling voltage, thereby turning off said semiconductor rectifying means.

2. A system as defined in claim 1 wherein said means for providing a DC enabling voltage includes a transformer with an ungrounded secondary and rectifier means for obtaining a floating DC enabling voltage.

3. A system as defined in claim 1 wherein said rectification means is connected directly to said AC power source.

4. A pulse magnetron system including a power supply comprising:
   a magnetron;
   pulse output transformer means connected to power said magnetron;
   a pulse forming network connected to said output transformer;
   a capacitor storage circuit;
   a pulse transformer interconnecting said capacitor storage circuit and said pulse forming network;
   control circuitry for charging and for selectively discharging said capacitor storage circuit;
   a source of AC power;
   rectification means coupled to said AC power source for providing DC charging current for said capacitor storage circuit;
   semiconductor means including control electrodes for selectively enabling or disabling said rectification means;
   means for deriving a low level DC control voltage from said AC power source;
   means for normally applying said control voltage to the control electrodes of said semiconductor means to enable rectification; and
   control circuitry responsive to high current fault conditions for charging the control voltage, thereby turning off said semiconductor rectifying means.

5. A system as defined in claim 4 wherein said means for providing a DC control voltage includes a transformer with an ungrounded secondary and rectifier means for obtaining a floating DC control voltage.

6. A pulse magnetron system including a power supply comprising:
   a magnetron;
   means for periodically generating and applying powerful pulses to energize said magnetron;
   a source of AC power;
   rectification means coupled to said AC power source for providing direct current to said pulse generating means;
   semiconductor means including control electrodes for selectively enabling or disabling said rectification means;
   means for deriving a low level DC control voltage from said AC power source;
   means for normally applying said control voltage to the control electrodes of said semiconductor means to enable rectification; and
   control circuitry responsive to high current fault conditions for changing the control voltage, thereby turning off said semiconductor rectifying means.

7. A system as defined in claim 6 wherein said means for providing a DC control voltage includes a transformer with an ungrounded secondary and rectifier means for obtaining said floating DC control voltage.

* * * * *